(12) United States Patent
Hilberer

(10) Patent No.: US 7,080,891 B1
(45) Date of Patent: Jul. 25, 2006

(54) SAFETY DEVICE FOR AN AUTOMOTIVE PNEUMATIC SYSTEM

(75) Inventor: Eduard Hilberer, Hockenheim (DE)

(73) Assignee: Knorr-Bremse Systeme Fuer Nutzfahrzeuge, Munich (DE)

( * ) Notice: Subject to any disclaimer, the term of this patent is extended or adjusted under 35 U.S.C. 154(b) by 107 days.

(21) Appl. No.: 10/048,596

(22) PCT Filed: Jul. 12, 2000

(86) PCT No.: PCT/EP00/06583

§ 371 (c)(1),
(2), (4) Date: Jun. 3, 2002

(87) PCT Pub. No.: WO01/08954

PCT Pub. Date: Feb. 8, 2001

(30) Foreign Application Priority Data

Aug. 2, 1999 (DE) ................................ 199 36 283

(51) Int. Cl.
*B60T 13/00* (2006.01)

(52) U.S. Cl. .................................. 303/6.01; 137/115.19
(58) Field of Classification Search ................ 303/6.01, 303/3, 15, 20; 137/115.19, 115.23, 118.06
See application file for complete search history.

(56) References Cited

U.S. PATENT DOCUMENTS

| | | | | |
|---|---|---|---|---|
| 2,996,885 A | * | 8/1961 | Margida | 137/118.06 |
| 3,370,602 A | * | 2/1968 | Nelson | 137/118.06 |
| 3,375,844 A | * | 4/1968 | Mercier et al. | 137/115.19 |
| 3,476,017 A | * | 11/1969 | Frisk et al. | 137/115.23 |
| 3,537,469 A | * | 11/1970 | Hagar | 137/116.3 |
| 3,726,301 A | * | 4/1973 | Schmidt | 137/115.23 |
| 4,114,637 A | * | 9/1978 | Johnson | 137/115.23 |
| 4,221,232 A | * | 9/1980 | Fantozzi | 137/118.06 |
| 4,476,889 A | * | 10/1984 | Haynes | 137/118.06 |
| 5,678,900 A | * | 10/1997 | Blanz | 303/6.01 |
| 6,089,831 A | * | 7/2000 | Bruehmann et al. | 303/3 |
| 6,540,308 B1 | * | 4/2003 | Hilberer | 303/6.01 |

FOREIGN PATENT DOCUMENTS

| | | | |
|---|---|---|---|
| DE | 19544621 C1 | * | 1/1997 |
| DE | 196 49 498 C1 | | 2/1998 |
| DE | 197 10 814 C1 | | 7/1998 |
| DE | 19710814 C1 | * | 7/1998 |
| WO | WO 9734785 A1 | * | 9/1997 |

* cited by examiner

*Primary Examiner*—Robert A. Siconolfi
(74) *Attorney, Agent, or Firm*—Crowell & Moring LLP

(57) ABSTRACT

The invention relates to a safety device for an automotive pneumatic system, whereby a safety valve comprising a restoring element is provided. The invention also relates to a method which enables an automotive pneumatic system to operate in a safety mode. Components such as the pressure control valve, the regeneration valve and a circuit protection device can be actuated in a normal operational mode. One of said components fails to function in the safety mode. The inventive safety device is characterized in that the force of the restoring element can be adjusted. The inventive method is characterized in that the restoring element of the safety valve is discharged in the safety mode.

5 Claims, 1 Drawing Sheet

SAFETY DEVICE FOR AN AUTOMOTIVE PNEUMATIC SYSTEM

BACKGROUND AND SUMMARY OF THE INVENTION

The invention relates to a safety device for an automotive pneumatic system, including a safety valve that includes a restoring element. The invention further relates to a method for operating an automotive pneumatic system in a safety mode. During normal operation, the pressure-regulator valve, regeneration valve and circuit-protection device components can be actuated. In the safety mode, at least one of the components fails to function.

U.S. Pat. No. 5,678,900 discloses a pneumatic system having a pressure regulator, a regeneration device, a circuit-protection device and a safety valve. The system serves to release compressed air when a magnet valve in the pressure regulator actuates a piston of the safety valve.

A drawback of such a system is that during currentless operation of the system, the compressor or the compressed-medium source is no longer regulated, and must operate counter to a maximum pressure, namely the safety-valve pressure of the safety valve of the pressure regulator. The safety-valve pressure of such a system is high, e.g., it must be higher than the maximum value of the pressure regulator. This can be harmful to the compressors, and may cause damage to valve devices that must be supplied directly with the safety-valve pressure, i.e., the initial pressure of the pressure-regulator valve, during currentless operation.

It is an objective of the present invention to disclose a safety device for an automotive pneumatic system, which is intended to prevent the compressor or the compressed-medium source from operating counter to an excessively-high pressure during currentless operation or in the safety mode, such as when electrical faults occur or when a plug breaks or the like, that is, particularly when at least one component fails. The present invention particularly assures less stress on the compressor or the compressed-medium source and the valve devices. It is a further objective of the present invention to disclose a corresponding method, with which it is possible to operate in a safety mode without greatly stressing the compressor and the valve devices.

The objective is accomplished by a safety device for an automotive pneumatic system that includes a safety valve having a restoring element with an adjustable restoring force. This measure allows the pneumatic system safety-valve pressure in the safety mode or currentless mode to be set lower than the safety-valve pressure in the normal operating mode, that is, when current is supplied.

If the restoring force of the restoring element can be adjusted by means of a pressure, and/or mechanically, which is preferable, this permits a simple, preferred embodiment in which existing elements of the pneumatic system can be utilized. The pressure can preferably be adjusted by way of a regeneration valve. For example, the regeneration valve can be set to deventilate a portion of the pneumatic system in the safety mode, or currentless mode—especially the portion acting on the restoring element. If the pressure acts on the restoring element via a piston or a diaphragm, as is preferable, this allows for an especially simple embodiment of the invention.

The restoring element is preferably a spring. Furthermore, the safety valve can preferably be actuated by a safety-valve piston, particularly in the normal operating mode.

An automotive pneumatic system is preferably provided with a safety device of the above-described type. A vehicle is also preferably provided with the above-described pneumatic system.

In accordance with the invention, a method for operating in the safety mode of an automotive pneumatic system, in which the pressure-regulator valve, regeneration valve and circuit-protection device components can be actuated in the normal operating mode, and at least one of the components fails to function in the safety mode, is characterized in that the restoring element of the safety valve is relieved or discharged in the safety mode. This method of the invention can be employed to easily accomplish the objective of avoiding heavy stressing of the compressed-medium source or the compressor, and the valve devices in the safety mode or the currentless mode, because the actuation pressure of the safety valve, i.e., the safety-valve pressure, can be set lower than in the normal operating mode.

The regeneration valve is preferably shut-off in the safety mode, causing the rear side of an element that acts on the restoring element to be deventilated. This preferred method step allows the restoring element to be relieved relatively simply, which in turn reduces the safety-valve pressure.

The invention is described below, without limiting the general inventive concept, by way of exemplary embodiments with reference to the drawings; reference should be made to these drawings for all of the inventive details not expressly described in the text.

DETAILED DESCRIPTION OF THE DRAWING

Figure 1:
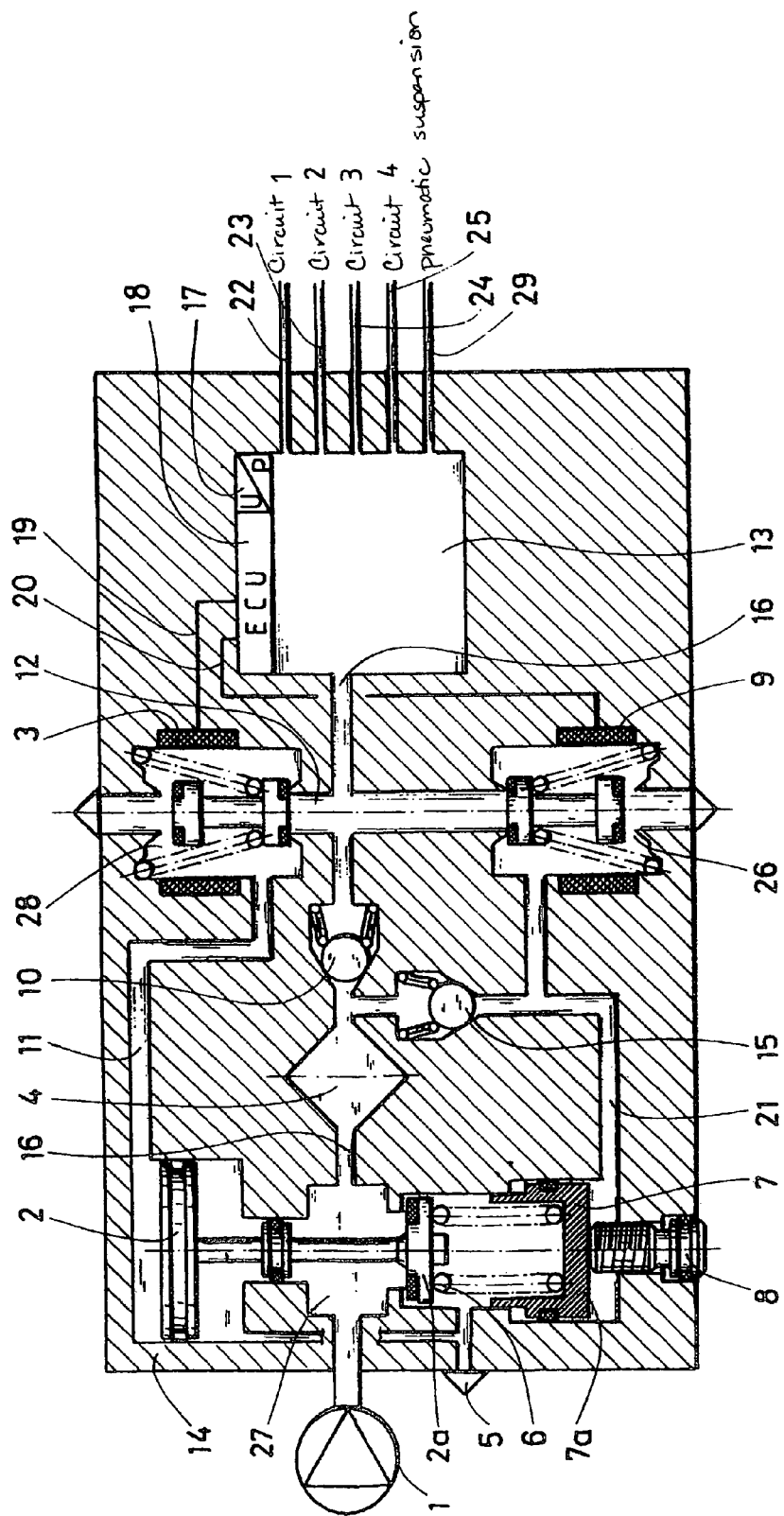
FIG. 1 is a sectional representation of a principle outline of a pneumatic system in accordance with the present invention.

In a sectional representation, FIG. 1 schematically illustrates a pneumatic system that encompasses a safety device in accordance with the invention. Refer to the list of reference characters appended hereto for individual part numbers.

A compressed-medium source 1, such as in particular a compressor, conveys a gas mixture, notably air, at a pressure of up to over 17 bar to the pneumatic system located in a housing 14. The air pressure is conveyed via a safety valve 27, a central supply line 16, a filter unit or drier cartridge 4, a pressure-regulator switching valve 10 and, again, to a central supply line 16' of a circuit-protection device 13. The circuit-protection device 13 is provided with control electronics and at least one pressure sensor. From the circuit-protection device 13, the circuits 1, 2, 3, 4 and the pneumatic suspension are supplied via the connectors 22 through 25 and the connector 29. Electrical lines 19 and 20 lead from the control electronics 18 to a pressure-regulator valve magnet 3 of a pressure-regulator valve 28 and the supply of the magnet 9 of a regeneration magnet valve 26.

FIG. 1 illustrates a safety mode or a currentless scenario. In the currentless scenario, that is, in the event of electrical faults, such as a plug break, or a power failure, or the like, the magnet valves 28 and 26 are shut-off. A pressure-regulator control line 11 is deventilated, as is a blocking line 21. The safety-valve spring 6 is relieved due to the lowered stroke of the blocking piston 7, since a lower pressure dominates at the piston rear side 7a. Thus, the safety-valve pressure is lower than before, that is, in the normal operating mode, for example down from 17 bar to 8.5 bar. The latter value can be set by adjusting screw 8. The safety-valve pressure in the normal operating mode, i.e., with a current supply, can particularly be adjusted via the pressure at the piston's rear side 7a, or in the blocking line 21. It is therefore possible, using appropriate means, to adjust the safety-valve pressure when current is being supplied, and/or to adjust the safety-valve pressure using the same or other means in the currentless scenario. This adjustment can be effected before and during the operation of the pneumatic system.

The illustrated embodiment is particularly advantageous because the regeneration valve 26 or the regeneration pressure circuit formed by the regeneration valve 26 and the regeneration check valve 15 is used without necessitating further, complicated components. The pressure-regulator shutoff pressure is, for example, 12.5 bar in this embodiment. The circuit-protection device 13 is a circuit-protection valve, for example.

The invention allows the compressed-medium source 1 (such as a compressor 1) to pump counter to a lower safety-valve pressure in the currentless scenario, which significantly extends the service life of the compressor or compressed-medium source 1. If the compressed-medium source 1 had to pump at 17 bar over an extended period, for example, a defect would occur within a very short time. The same applies to other valve devices that, to some extent, must also endure such high pressure.

In the event of a partial power failure, such as a break in a cable of the electrical line 19, the control electronics register the event, and the regeneration valve 26 is then shut off.

LIST OF REFERENCE CHARACTERS

1 Compressed-medium source
2 Safety-valve piston
2a Safety-valve seat
3 Pressure-regulator valve magnet
4 Filter unit (drier cartridge)
5 Deventilation system
6 Safety-valve spring
7 Blocking piston
7a Piston rear side
8 Setting screw
9 Regeneration-valve magnet
10 Pressure-regulator switching valve
11 Pressure-regulator control line
12 Control supply line
13 Circuit-protection device
14 Housing
15 Regeneration check valve
16 Central supply line
17 Pressure sensor
18 Control electronics
19 Electrical line
20 Electrical line
21 Blocking line
22 Connector for circuit 1
23 Connector for circuit 2
24 Connector for circuit 3
25 Connector for circuit 4
26 Regeneration valve
27 Safety valve
28 Pressure-regulator valve
29 Connector for pneumatic suspension

The invention claimed is:

1. A safety device for an automotive pneumatic system, comprising:
   a safety valve including a restoring element having an adjustable restoring force;
   one of a safety valve piston and a diaphragm operatively coupled to adjust the restoring force of the restoring element in a normal operating mode by application of a pressure medium to said piston or diaphragm; and
   a safety valve piston operatively coupled to actuate the safety valve in a normal operating mode,
   wherein the restoring force of the restoring element is adjustable during operation of the automotive pneumatic system by a mechanical mechanism acting on the safety valve piston or diaphragm coupled to adjust the restoring force.

2. The safety device according to claim 1, wherein said restoring element is a spring.

3. A system, comprising:
   an automotive pneumatic system; and
   a safety device coupled with said automotive pneumatic system, said safety device including:
   a safety valve including a restoring element having an adjustable restoring force; and
   one of a piston and a diaphragm operatively coupled to adjust the restoring force of the restoring element in a normal operating mode by application of a pressure medium to said piston or diaphragm; and
   a safety valve piston operatively coupled to actuate the safety valve in a normal operating mode,
   wherein the restoring force of the restoring element is adjustable during operation of the automotive pneumatic system by a mechanical mechanism acting on the safety valve piston or diaphragm coupled to adjust the restoring force.

4. The system according to claim 3, wherein said restoring element is a spring.

5. A safety device for an automotive pneumatic system, comprising:
   a safety valve including a restoring element having continuously adjustable restoring force; and
   a safety valve piston operatively coupled to adjust the restoring force of the restoring element in a normal operating mode,
   wherein the restoring force of the restoring element is adjustable during operation of the automotive pneumatic system by a pressure medium and a mechanical mechanism acting on the safety valve piston.

* * * * *

UNITED STATES PATENT AND TRADEMARK OFFICE
CERTIFICATE OF CORRECTION

PATENT NO. : 7,080,891 B1 Page 1 of 1
APPLICATION NO. : 10/048596
DATED : July 25, 2006
INVENTOR(S) : Eduard Hilberer It is certified that error appears in the above-identified patent and that said Letters Patent is hereby corrected as shown below:

ON THE TITLE PAGE:

UNDER ASSIGNEE (ITEM 73):

"Knorr-Bremse Systeme Fuer Nutzfahzeuge" should read --Knorr-Bremse Systeme Fuer Nutzfahzeuge GmbH--.

Signed and Sealed this

Fourteenth Day of August, 2007

JON W. DUDAS
*Director of the United States Patent and Trademark Office*